(12) United States Patent
Bae et al.

(10) Patent No.: US 10,110,275 B2
(45) Date of Patent: Oct. 23, 2018

(54) FREQUENCY OFFSET ESTIMATION AND COMPENSATION METHOD

(71) Applicant: ELECTRONICS AND TELECOMMUNICATIONS RESEARCH INSTITUTE, Daejeon (KR)

(72) Inventors: Jae Hwui Bae, Daejeon (KR); Sang-Jung Ra, Daejeon (KR); Jin Hyuk Song, Daejeon (KR); Joon Young Jung, Daejeon (KR); Dong Joon Choi, Daejeon (KR); Namho Hur, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/656,906

(22) Filed: Jul. 21, 2017

(65) Prior Publication Data

US 2018/0102808 A1     Apr. 12, 2018

(30) Foreign Application Priority Data

Oct. 7, 2016    (KR) ........................ 10-2016-0130041

(51) Int. Cl.
| | | |
|---|---|---|
| *H04B 3/00* | (2006.01) | |
| *H04B 3/46* | (2015.01) | |
| *H04B 17/21* | (2015.01) | |
| *H04B 1/06* | (2006.01) | |
| *H04B 3/23* | (2006.01) | |
| *H04L 5/00* | (2006.01) | |

(Continued)

(52) U.S. Cl.
CPC ................ *H04B 3/46* (2013.01); *H04B 1/06* (2013.01); *H04B 3/232* (2013.01); *H04B 17/21* (2015.01); *H04L 5/001* (2013.01); *H04L 7/0079* (2013.01); *H04L 69/323* (2013.01)

(58) Field of Classification Search
CPC . H04B 3/46; H04B 17/21; H04B 1/06; H04B 3/232; H04L 5/001; H04L 7/0079; H04L 69/323
See application file for complete search history.

(56) References Cited

U.S. PATENT DOCUMENTS

| | | |
|---|---|---|
| 8,532,201 B2 | 9/2013 | Park et al. |
| 8,559,569 B1 * | 10/2013 | Zhou ................... H04L 27/2613 375/316 |
| 8,964,886 B2 | 2/2015 | Um et al. |

(Continued)

*Primary Examiner* — Khanh C Tran (57) ABSTRACT

A method of estimating an integer frequency offset and compensating for the integer frequency offset by an estimated error is provided. A frequency offset estimation method may include receiving a reception signal including PLC data and a physical layer link channel (PLC) preamble, detecting first position information on a position of a subcarrier of the PLC preamble in a frequency axis from the reception signal through a cross-correlation between the PLC preamble and the reception signal, detecting second position information on the position of the subcarrier of the PLC preamble defined in a transmission end by restoring the PLC data, and calculating a frequency offset by comparing the first position information with the second position information.

10 Claims, 12 Drawing Sheets

(51) Int. Cl.
   *H04L 7/00*      (2006.01)
   *H04L 29/08*     (2006.01)

(56) References Cited

U.S. PATENT DOCUMENTS

| | | | |
|---|---|---|---|
| 9,356,979 B2 | 5/2016 | Bashar et al. | |
| 2008/0260085 A1* | 10/2008 | Lin | H04L 27/2659 |
| | | | 375/362 |
| 2010/0027723 A1 | 2/2010 | Kim et al. | |
| 2010/0082722 A1* | 4/2010 | Sinnokrot | G06F 17/142 |
| | | | 708/404 |
| 2011/0019782 A1* | 1/2011 | Kobayashi | H04L 27/2659 |
| | | | 375/344 |
| 2014/0079102 A1* | 3/2014 | Kliger | H04L 5/0046 |
| | | | 375/222 |
| 2015/0071374 A1* | 3/2015 | Oh | H04L 25/0224 |
| | | | 375/295 |
| 2016/0087736 A1* | 3/2016 | Murakami | H04H 60/42 |
| | | | 370/312 |
| 2016/0156493 A1 | 6/2016 | Bae et al. | |
| 2017/0272184 A1* | 9/2017 | Zinevich | H04B 17/345 |
| 2018/0014268 A1* | 1/2018 | Kuppusamy | H04W 56/0035 |

\* cited by examiner

FIG. 10

FREQUENCY OFFSET ESTIMATION AND COMPENSATION METHOD

CROSS-REFERENCE TO RELATED APPLICATION(S)

This application claims the priority benefit of Korean Patent Application No. 10-2016-0130041 filed on Oct. 7, 2016, in the Korean Intellectual Property Office, the disclosure of which is incorporated herein by reference for all purposes.

BACKGROUND

1. Field

One or more example embodiments relate to a frequency offset estimation and compensation method, and more particularly, to an integer frequency offset estimation and compensation method in a data over cable service specification (DOCSIS) 3.1 downstream system.

2. Description of Related Art

A receiver of a data over cable service specification (DOCSIS) 3.1 downstream system may essentially include a function of restoring a reception signal through a process of compensating for a frequency offset present in the reception signal, a process of compensating for a sampling offset, and a process of estimating and equalizing a channel. In particular, the DOSIS 3.1 downstream system based on an orthogonal frequency division multiplexing (OFDM) transmission system may deteriorate orthogonality between frequency subcarriers of the OFDM transmission system when a frequency offset is present, resulting in severe reception performance degradation. Thus, the receiver of the DOCSIS 3.1 downstream system may require a frequency synchronization obtaining function for estimating and compensating for a frequency offset.

SUMMARY

An aspect provides an integer frequency offset estimation and compensation method in a receiver of a data over cable service specification (DOCSIS) 3.1 downstream system. A frequency offset is estimated and compensated in order to prevent orthogonality between subcarriers from being broken by an integer frequency offset in an orthogonal frequency division multiplexing (OFDM) transmission system such that interference between the subcarriers that may occur when OFDM modulation is performed may be removed from a reception signal.

Another aspect also provides an integer frequency offset estimation and compensation method using a position of a physical layer link channel (PLC) subcarrier in a frequency direction from a reception signal detected through a PLC preamble correlation that operates reliably in a relatively low signal-to-noise ratio (SNR).

According to an aspect, there is provided a frequency offset estimation method temporarily performed by a computer including receiving a reception signal including PLC data and a physical layer link channel (PLC) preamble, detecting first position information on a position of a subcarrier of the PLC preamble in a frequency axis from the reception signal through a cross-correlation between the PLC preamble and the reception signal, detecting second position information on the position of the subcarrier of the PLC preamble defined in a transmission end by restoring the PLC data, and calculating a frequency offset by comparing the first position information with the second position information.

The detecting of the first position information may include detecting a position of a subcarrier on the frequency axis at which the cross-correlation between the PLC preamble and the reception signal corresponds to a maximum value and determining the position of the subcarrier as the first position information. The method may further include converting the PLC preamble corresponding to two-dimensional (2D) data into one-dimensional (1D) data, and acquiring the cross-correlation by selecting a signal of which a size is identical to a size of the PLC preamble from the reception signal.

The detecting of the second position information may include detecting the PLC data based on a position of the PLC preamble detected from the reception signal, and detecting a position of a PLC subcarrier positioned in a transmission device by restoring the detected PLC data and determining the position of the PLC subcarrier as the second position information.

The method may further include compensating for an integer frequency offset by calculating a difference between the first position information and the second position information and compensating for a position of a spectrum of the reception signal by the calculated difference. The compensating for the integer frequency offset may include compensating for the frequency offset by moving the spectrum of the reception signal by the calculated difference. The compensating for the integer frequency offset may include compensating for the frequency offset by moving a spectrum of the reception signal by the calculated frequency offset, or the compensating for the integer frequency offset may include compensating for the frequency offset by correcting a start point of the spectrum of the reception signal based on a size of the calculated difference.

The calculating of the frequency offset may include calculating an integer frequency offset based on the frequency offset.

The reception signal may be transmitted based on a data over cable service specification (DOCSIS) 3.1 downstream system.

According to another aspect, there is provided a data reception apparatus including a receiver configured to receive a reception signal including PLC data and a physical layer link channel (PLC) preamble, a frequency offset estimator configured to detect first position information on a position of a subcarrier of the PLC preamble in a frequency axis from the reception signal through a cross-correlation between the PLC preamble and the reception signal, detect second position information on the position of the subcarrier of the PLC preamble defined in a transmission end by restoring the PLC data, and calculate a frequency offset by comparing the first position information with the second position information, and a frequency offset compensator configured to compensate for an integer frequency offset by calculating a difference between the first position information and the second position information, and compensating for a position of a spectrum of the reception signal by the calculated difference.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, reference will now be made in detail to embodiments of the present invention, examples of which are illustrated in the accompanying drawings, wherein like reference numerals refer to the like elements throughout. Embodiments are described below to explain the present invention, referring to the figures.

The terms used herein are mainly selected from general terms currently being used in light of functions in the present disclosure. Yet, other terms may be used depending on the development of and/or changes in technology, a custom, or a preference of an operator.

In addition, in a specific case, the most appropriate terms are arbitrarily selected by the applicant for ease of description and/or for ease of understanding. In this instance, the meanings of the arbitrarily used terms will be clearly explained in the corresponding description. Hence, the terms should be understood not by the terms per se but by the meanings of the terms and the following overall description of this specification.

A reception apparatus of a data over cable service specification (DOCSIS) 3.1 downstream system may essentially require a function of restoring a reception signal through a process of compensating for a frequency offset present in a reception signal, a process of compensating for a sampling offset, and a process of estimating and equalizing a channel. In particular, the DOSIS 3.1 downstream system based on an orthogonal frequency division multiplexing (OFDM) transmission system may deteriorate orthogonality between frequency subcarriers of the OFDM transmission system when a frequency offset is present, resulting in severe reception performance deterioration. Thus, quality of a reception signal in the reception apparatus of the DOCSIS 3.1 downstream system may be determined based on a frequency synchronization obtaining function for estimating and compensating for a frequency offset.

A frequency offset may be divided into two types depending on subcarrier spacing. The frequency offset may be divided into a decimal frequency offset having a size less than the subcarrier spacing and an integer frequency offset having a multiple size of the subcarrier spacing. In an example, a method by which the reception apparatus estimates and compensates for an integer frequency offset in the DOCSIS 3.1 downstream system is provided. In more detail, an integer frequency offset present in a reception signal may be estimated by obtaining a cross-correlation between the reception signal and a binary phase shift keying (BPSK) modulated physical layer link channel (PLC) preamble signal of a transmission end using the PLC preamble signal present in the DOCSIS 3.1 downstream system.

Figure 1:
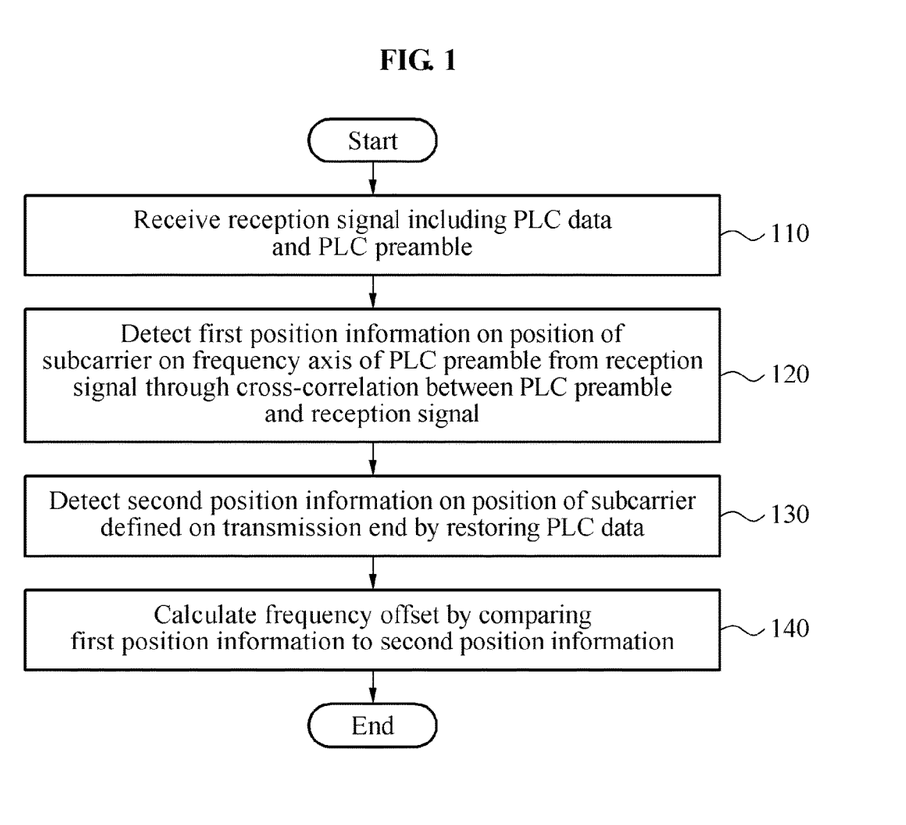
FIG. 1 is a flowchart illustrating a frequency offset estimation method according to an example embodiment.

FIG. 1 is a flowchart illustrating a frequency offset estimation method according to an example embodiment. The frequency offset estimation method includes operation 110 of receiving a reception signal including PLC data and a PLC preamble, operation 120 of detecting first position information on a position of a subcarrier of the PLC preamble in a frequency axis from the reception signal through a cross-correlation between the PLC preamble and the reception signal, operation 130 of detecting second position information on the position of the subcarrier of the PLC preamble defined in a transmission end by restoring the PLC data, and operation 140 of calculating a frequency offset by comparing the detected first position information with the second position information.

A structure of the reception signal in operation 110 is described in detail below with reference to FIGS. 2 and 3.

Figure 2:
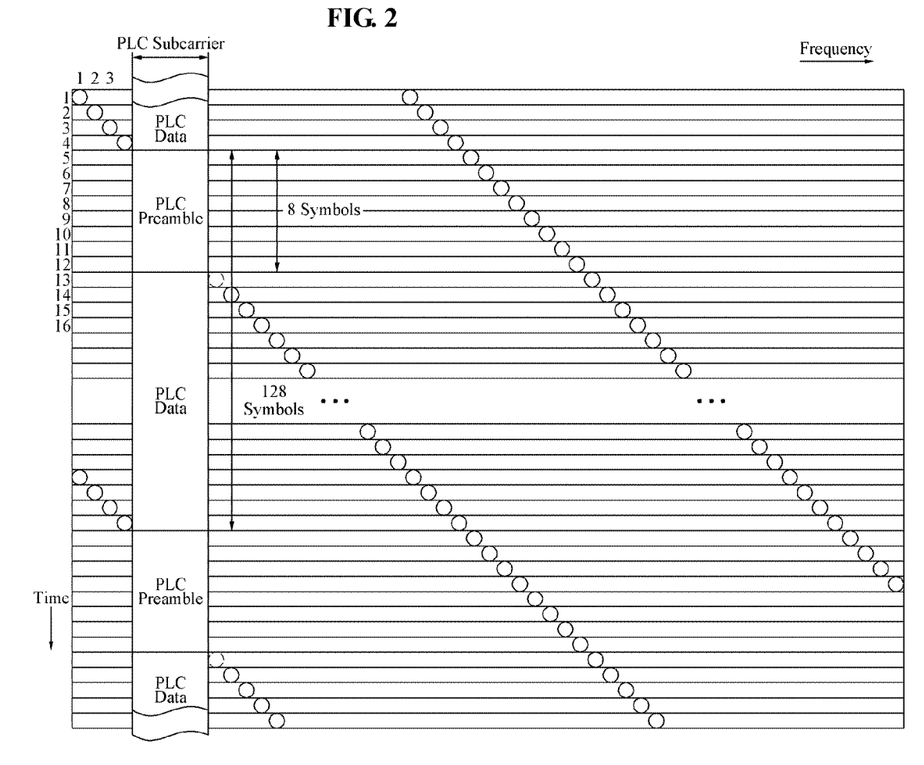
FIG. 2 illustrates a physical layer link channel (PLC) structure of a data over cable service specification (DOCSIS) 3.1 downstream system according to an example embodiment.

FIG. 2 illustrates a physical layer link channel (PLC) structure of a data over cable service specification (DOCSIS) 3.1 downstream system according to an example embodiment. As illustrated in FIG. 2, the PLC structure of the DOCSIS 3.1 downstream structure includes PLC preambles, PLC data, and 128 orthogonal frequency division multiplexing (OFDM) symbols. A PLC preamble is a known value between transmission and reception, and the PLC data may perform a role of transmitting an OFDM modulation parameter. Among 128 OFDM symbols, a PLC preamble includes 8 OFDM symbols, and the PLC data includes 120 OFDM symbols. Also, the PLC preamble may be repeated on 128 OFDM symbol cycle. Binary phase shift keying (BPSK) modulation may be applied to the PLC preamble, and 16 quadrature amplitude modulation (QAM) may be applied to the PLC data.

In FIG. 2, a PLC subcarrier has a bandwidth of 6 megahertz (MHz), and the 6 MHz bandwidth including PLC may be present by moving its position in 1 MHz unit in a frequency axis. The PLC subcarrier is present in a center of the 6 MHz bandwidth.

Figure 3:
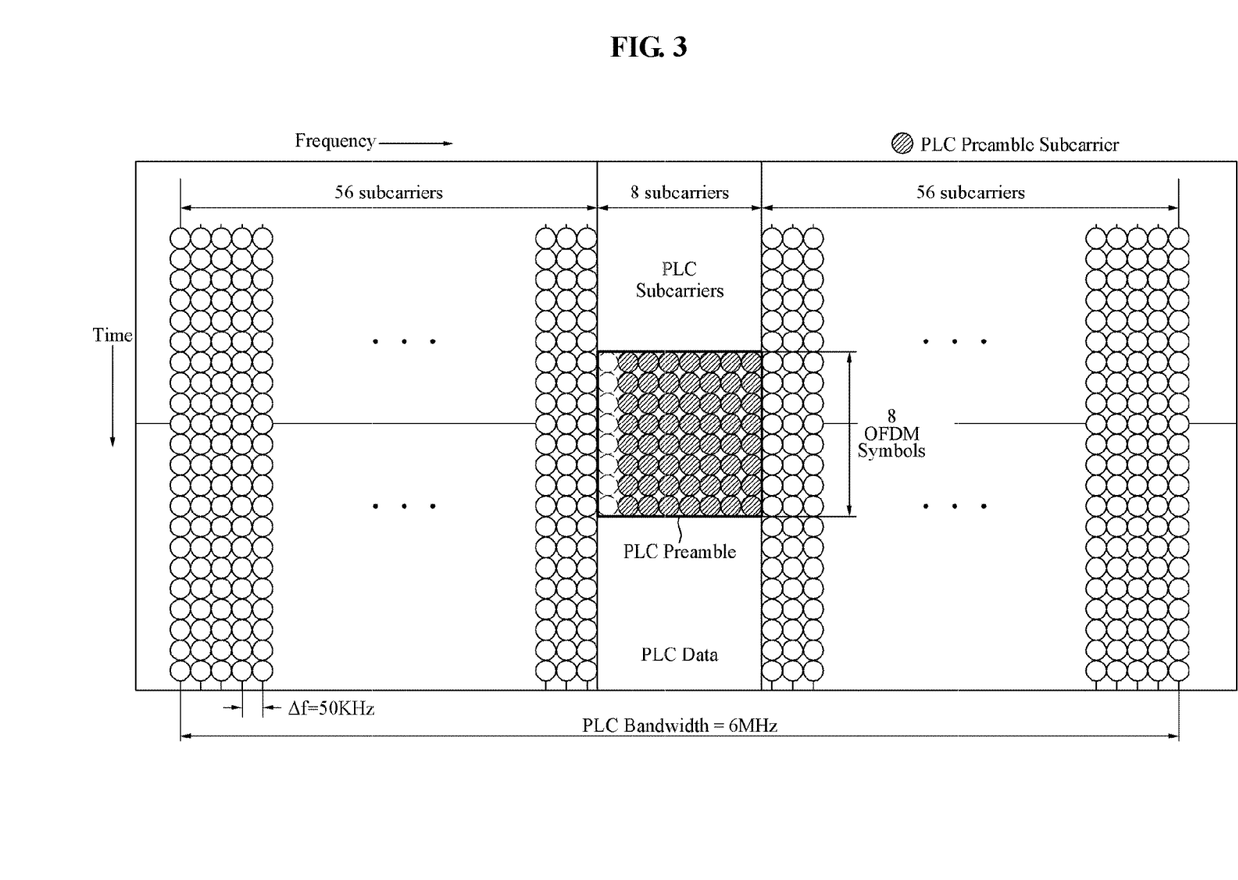
FIG. 3 illustrates a subcarrier structure within a physical layer link channel (PLC) bandwidth in a 4K-fast Fourier transform (FFT) mode of a data over cable service specification (DOCSIS) 3.1 downstream system according to an example embodiment.

FIG. 3 illustrates a subcarrier structure within a physical layer link channel (PLC) bandwidth in a 4K-fast Fourier transform (FFT) mode of a data over cable service specification (DOCSIS) 3.1 downstream system according to an example embodiment. Because subcarrier spacing in the 4K-FFT mode is $\Delta f=50$ KHz, 120 $((6\times10^6)/(50\times10^3)=120)$ subcarriers are present within a PLC 6 MHz bandwidth. Among 120 subcarriers, 56 subcarriers are present on each of a right side and a left side of a frequency axis, and 8 subcarriers corresponding to PLC subcarriers are present in a center of the frequency axis.

Figure 4:
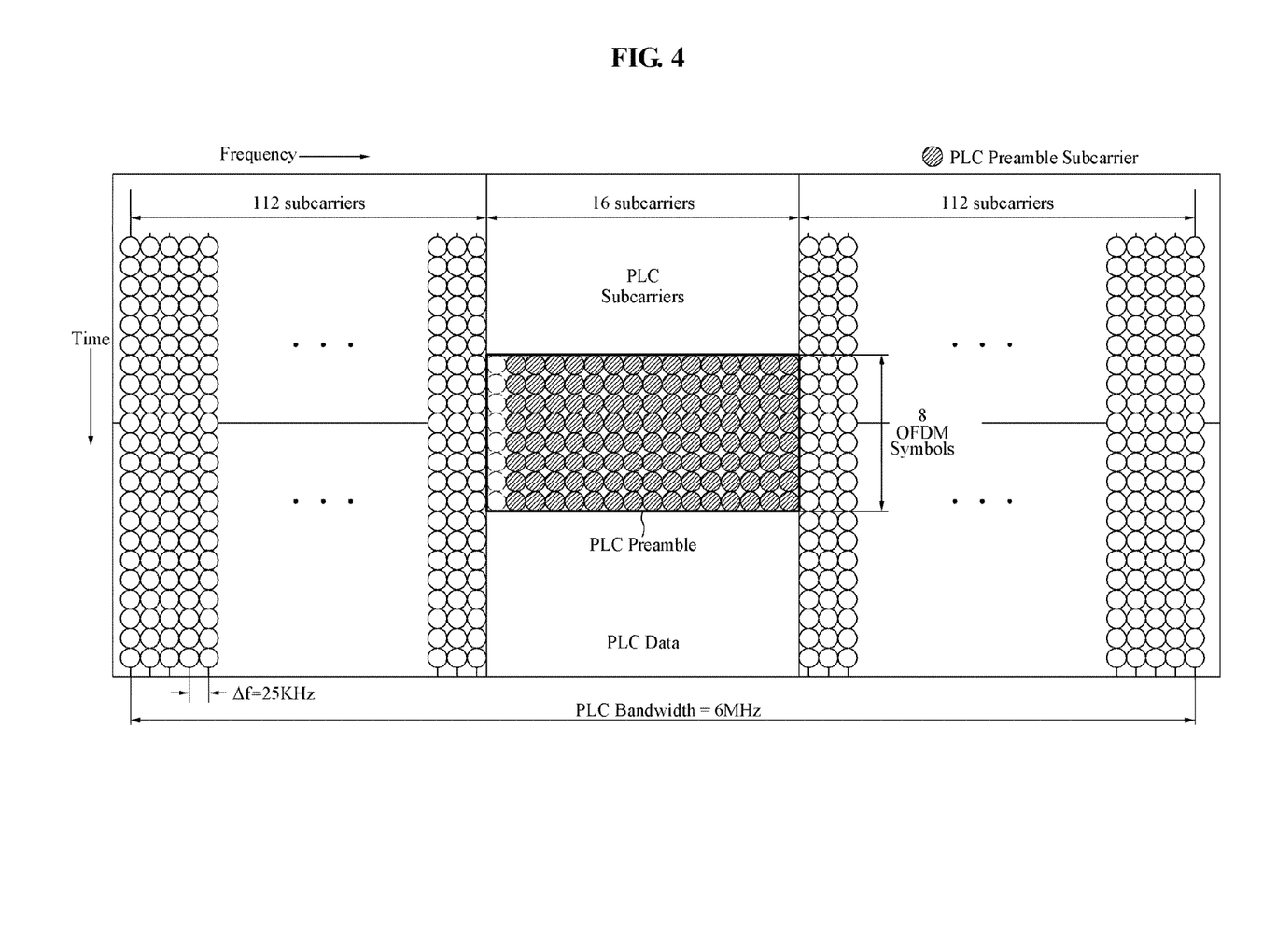
FIG. 4 illustrates a subcarrier structure within a physical layer link channel (PLC) bandwidth in a 8K-fast Fourier transform (FFT) mode of a data over cable service specification (DOCSIS) 3.1 downstream system according to an example embodiment.

As another example, FIG. 4 illustrates a subcarrier structure within a physical layer link channel (PLC) bandwidth in a 8K-fast Fourier transform (FFT) mode of a data over cable service specification (DOCSIS) 3.1 downstream system according to an example embodiment. Because subcarrier spacing in the 8K-FFT mode is $\Delta f=25$ KHz, 240 $((6\times10^6)/(25\times10^3)=240)$ subcarriers are present within a PLC 6 MHz bandwidth. Among 240 subcarriers, 112 subcarriers are present on each of a right side and a left side of a frequency axis, and 16 subcarriers corresponding to PLC subcarriers are present in a center of the frequency axis.

In operation 120, the PLC preamble is a known value between transmission and reception. In more detail, a process of detecting positions of the PLC preamble and the PLC data from the reception signal is described below.

Figure 5A:
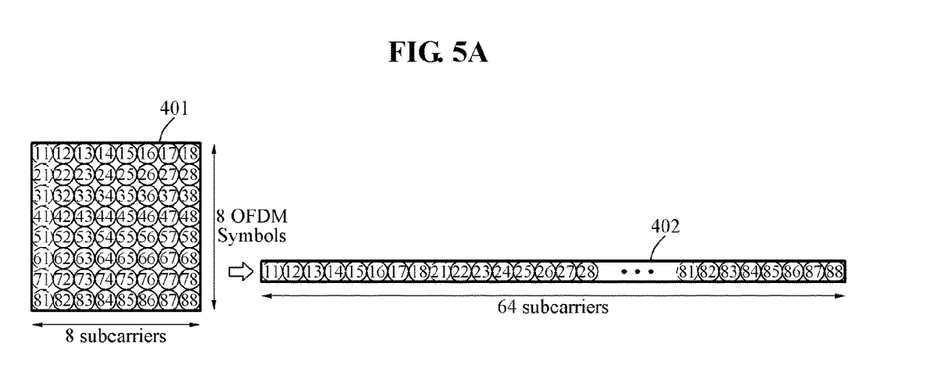
FIG. 5A illustrates a process of converting a two-dimensional (2D) transmission physical layer link channel (PLC) preamble into one-dimensional (1D) data in a 4K-fast Fourier transform (FFT) mode of FIG. 3 according to an example embodiment.
Figure 5B:
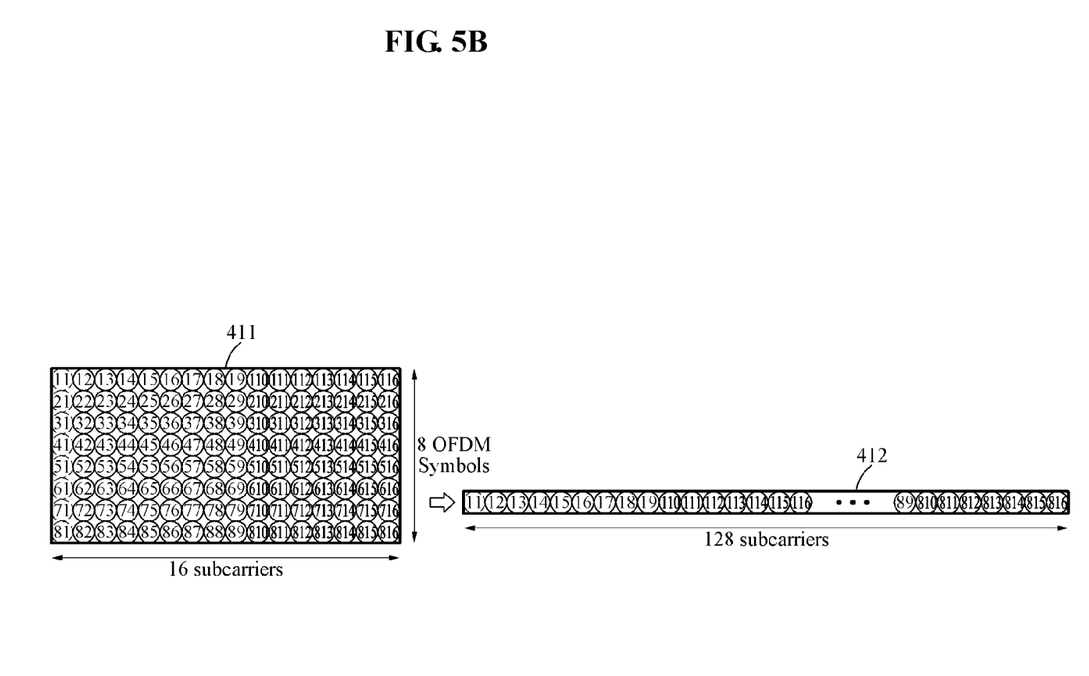
FIG. 5B illustrates a process of converting a two-dimensional (2D) transmission physical layer link channel (PLC) preamble into one-dimensional (1D) data in a 8K-fast Fourier transform (FFT) mode of FIG. 4 according to an example embodiment.

At first, the position of the PLC preamble on the frequency axis may be detected from the reception signal through a cross-correlation with the PLC preamble. Here, a position of a subcarrier on the frequency axis at which a cross-correlation between the PLC preamble and the reception signal corresponds to a maximum value may be detected and stored. In detail, as illustrated in FIGS. 5A and 5B, a transmission PLC preamble signal of the 4K-FFT mode may have a two-dimensional (2D) form 401 of 8×8 size, and a transmission PLC preamble signal of the 8K-FFT mode may have a 2D form 411 of 8×16 size. To obtain the cross-correlation, a reception signal in a 2D form may be converted into one-dimensional (1D) data signal.

FIG. 5A illustrates a process of converting a 2D transmission PLC preamble into one-dimensional (1D) data in a 4K-FFT mode of FIG. 3 according to an example embodiment. The 2D transmission PLC preamble of 8×8 size may be converted into a 1D transmission PLC preamble 402 of 1×64 size. Here, the PLC preamble may be data on which binary phase shift keying (BPSK) modulation is performed. FIG. 5B illustrates a process of converting a 2D transmission PLC preamble into 1D data in a 8K-FFT mode of FIG. 4 according to an example embodiment. The 2D transmission PLC preamble of 8×16 size may be converted into a 1D transmission PLC preamble 412 of 1×128 size. Also, the PLC preamble may be data on which BPSK modulation is performed.

Subsequently, a signal of which a size is identical to a size of the PLC preamble signal is selected from the reception signal in order to obtain a cross-correlation between the transmission PLC preamble signal and the reception signal. Referring back to FIG. 2, due to a repetition cycle of the PLC preamble corresponding to 128 OFDM symbols, the reception signal may store and apply at least 128 signals. Conversely, at least one PLC preamble may be present within 128 OFDM symbols.

A range for selecting the reception signal in a frequency axis direction is as follows.

Because a PLC signal has a 6 MHz bandwidth, a range in which a PLC 6 MHz band is present in the frequency axis direction may be present at 1 MHz spacing within a range of N~(3800−N+1) with a signal of 8×8 size in the 4K-FFT mode. In the 8K-FFT mode, the range may be present at 1 MHz spacing within a range of N~(7800−N+1) with a signal of 8×16 size. A number of subcarriers present within 1 MHz spacing corresponds to 20 in the 4K-FFT mode, and the number of subcarriers present within 1 MHz spacing corresponds to 40 in the 8K-FFT mode. Thus, in the 4K-FFT mode, a range for selecting the reception signal of 8×8 size in the frequency axis direction may start from a start point N to a position of (3800−N+1) by increasing a number of a position in 20 subcarrier units. In the 8K-FFT mode, a range for selecting the reception signal of 8×16 size in the frequency axis direction may start from the start point N to a position of (7600−N+1) by increasing a number of a position in 40 subcarrier units.

A range for selecting the reception signal in a time axis direction is as follows.

Because a PLC signal has a bandwidth of OFDM 6 MHz, a first OFDM symbol may increase in one OFDM symbol unit with respect to 128 OFDM symbols, the signal of 8×8 size may be extracted from consecutive 8 OFDM symbols including a corresponding OFDM symbol in the 4K-FFT mode, and the signal of 8×16 size may be extracted from consecutive 8 OFDM symbols including a corresponding OFDM symbol in the 8K-FFT mode and thus, the extracted signal of 8×16 size and the signal of 8×16 size may be applied to the cross-correlation.

Figure 6A:
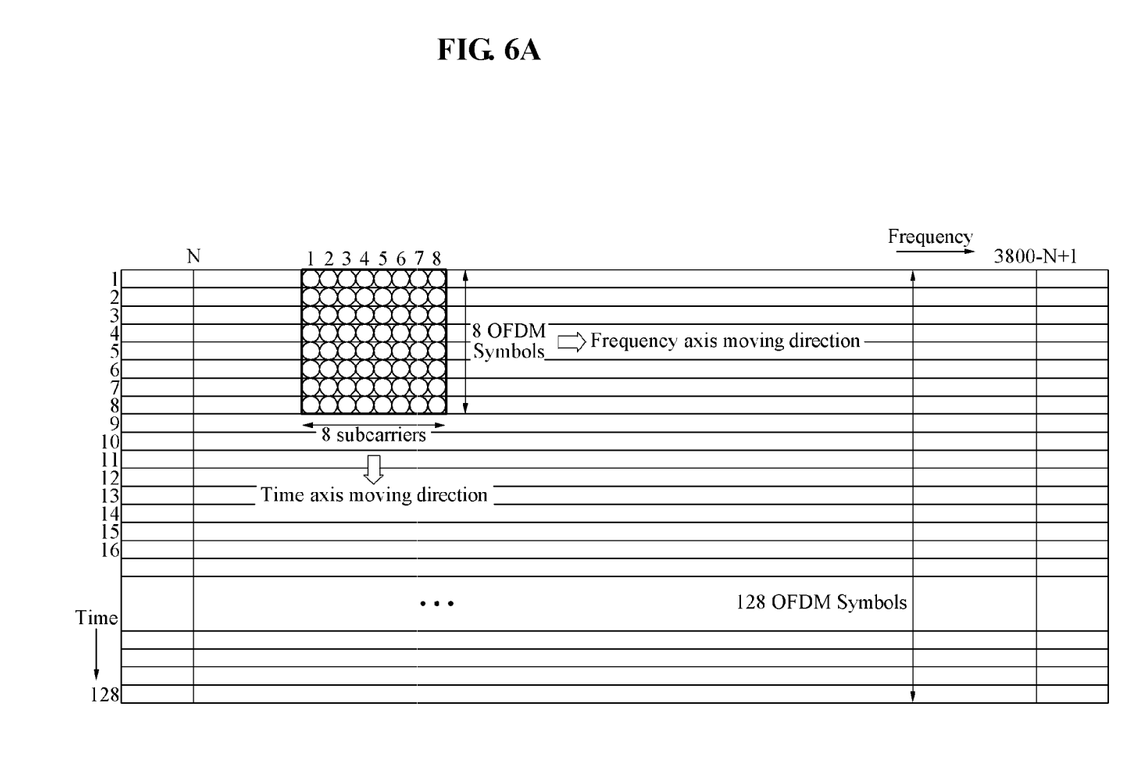
FIG. 6A illustrates a process of selecting a signal having a cross-correlation among reception signals of a 4K-fast Fourier transform (FFT) mode of FIG. 3 according to an example embodiment.
Figure 6B:
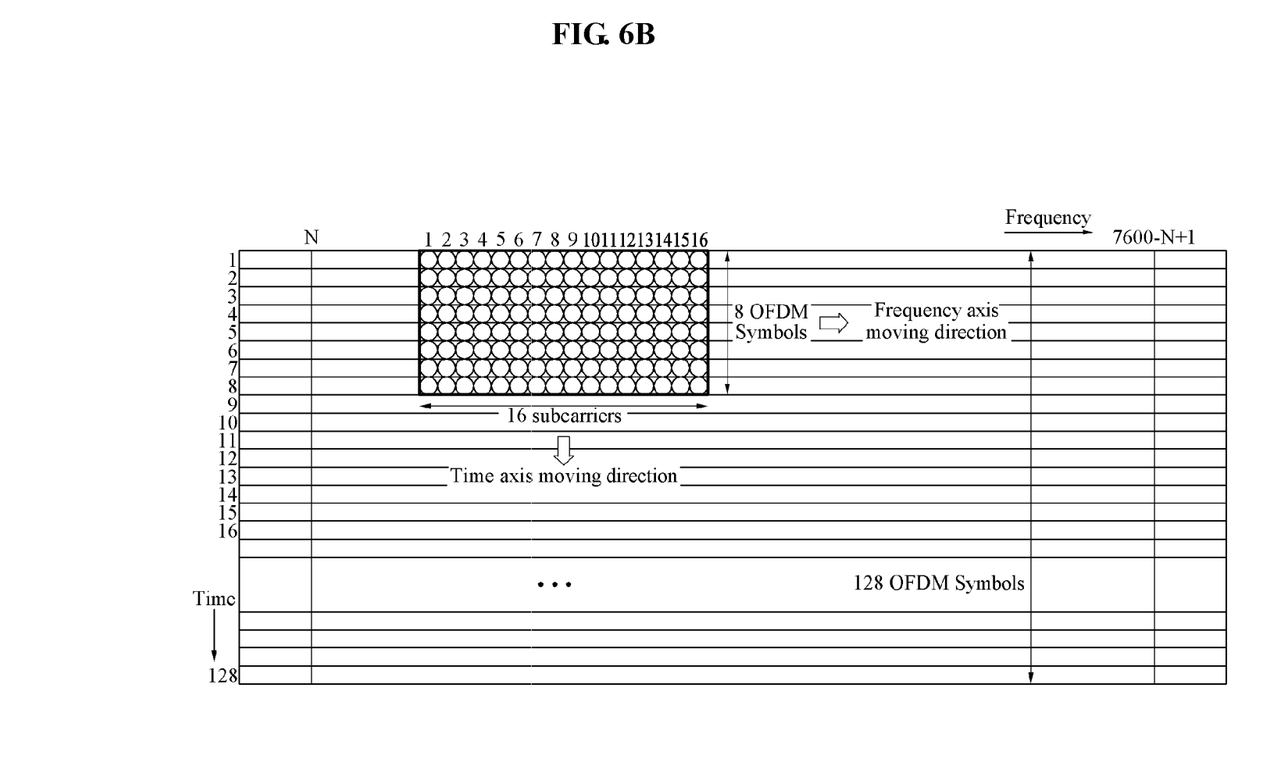
FIG. 6B illustrates a process of selecting a signal having a cross-correlation among reception signals of a 8K-fast Fourier transform (FFT) mode of FIG. 4 according to an example embodiment.

FIG. 6A illustrates a process of selecting a signal having a cross-correlation among reception signals of a 4K-fast Fourier transform (FFT) mode of FIG. 3 according to an example embodiment. In FIG. 6A, a horizontal axis indicates a frequency and a vertical axis indicates a time. 8×8 subcarriers may be detected within a range of N~(3800−N+1) based on a frequency axis moving direction of the horizontal axis. FIG. 6B illustrates a process of selecting a signal having a cross-correlation among reception signals of a 8K-FFT mode of FIG. 4 according to an example embodiment. Identical to FIG. 6A, a horizontal axis indicates a frequency and a vertical axis indicates a time. 8×16 subcarriers may be detected within a range of N~(7600−N+1) based on a frequency axis moving direction. Also, in FIGS. 6A and 6B, 128 OFDM symbols may be repeated based on a time axis.

Figure 7A:
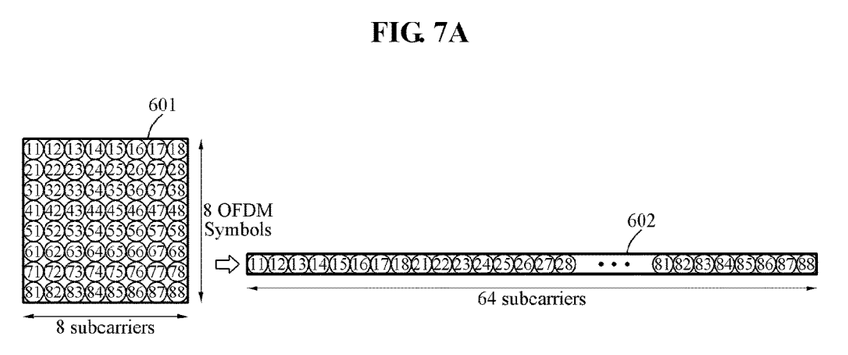
FIG. 7A illustrates a process of converting a two-dimensional (2D) reception signal into one-dimensional (1D) data to be applied to a cross-correlation of a 4K-fast Fourier transform (FFT) mode of FIG. 3 according to an example embodiment.
Figure 7B:
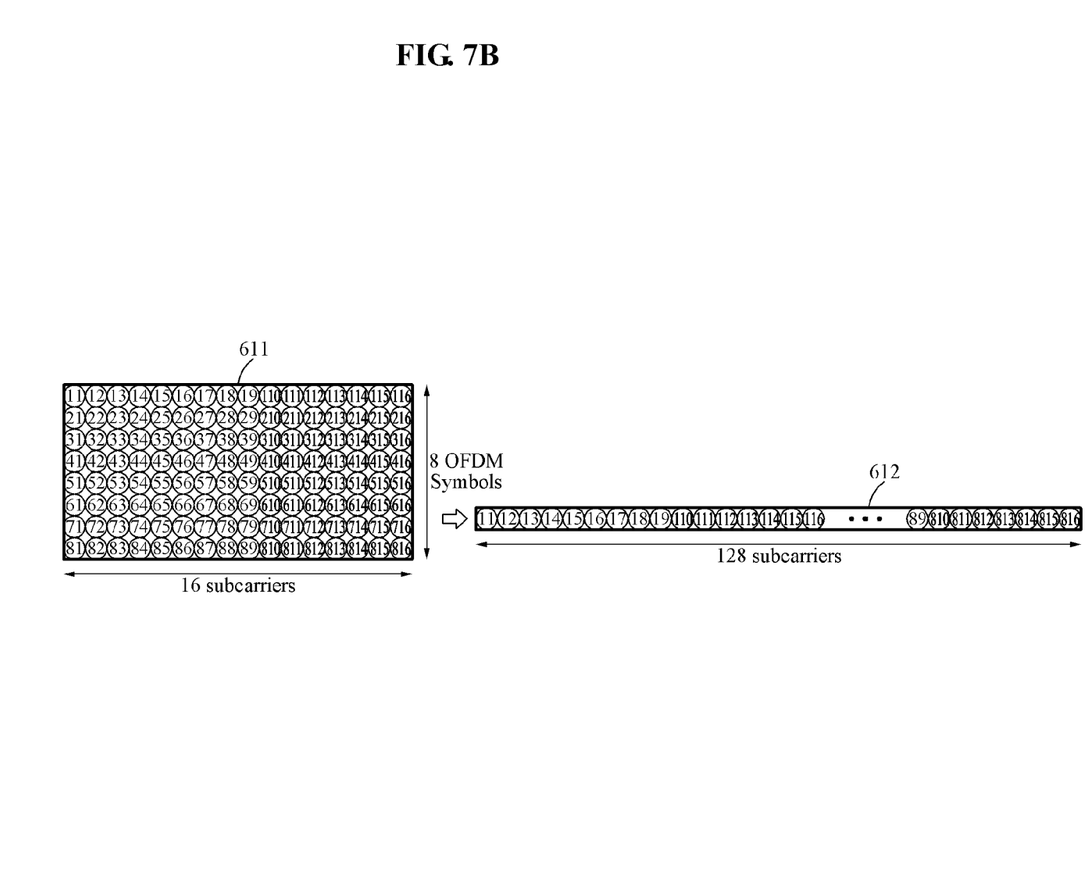
FIG. 7B illustrates a process of converting a two-dimensional (2D) reception signal into one-dimensional (1D) data to be applied to a cross-correlation of a 8K-fast Fourier transform (FFT) mode of FIG. 4 according to an example embodiment.

A process of converting a 2D reception signal to be applied to a cross-correlation among reception signals into one-dimensional (1D) data is as follows. FIG. 7A illustrates a process of converting a 2D reception signal 601 into 1D data 602 to be applied to a cross-correlation of a 4K-FFT mode of FIG. 3 according to an example embodiment, and FIG. 7B illustrates a process of converting a 2D reception signal 611 into 1D data 612 to be applied to a cross-correlation of a 8K-FFT mode of FIG. 4 according to an example embodiment.

A 2D signal may be converted into 1D data in order to obtain a cross-correlation by extracting a signal of which a size is identical to a size of a transmission PLC preamble signal from a reception signal. With respect to each of 8 consecutive OFDM symbols in the reception signal, the 4K-FFT mode may extract subcarriers at eight consecutive frequency positions, and the 8K-FFT mode may extract subcarriers at 16 consecutive frequency positions such that the cross-correlation with the transmission PLC preamble signal is acquired. Thus, a form of a signal to be applied to the cross-correlation in the 4K-FFT mode may be a 2D form as illustrated in FIG. 7A, and a form of a signal to be applied to the cross-correlation in the 8K-FFT mode may be represented as a form illustrated in FIG. 7B. To convert the 2D signal into a 1D signal, a subcarrier 21 in a second row is disposed at a next position of a rightmost subcarrier 18 in a first row. A subcarrier 31 in a third row may be disposed at a next position of a subcarrier 28 in the second row and such process may be repeated from a fourth row to an eighth row such that the 4K-FFT mode may obtain a 1D reception signal of 1×64 size as illustrated in FIG. 7A. The 8K-FFT mode may obtain a 1D reception signal of 1×128 size as illustrated in FIG. 7B based on the same method.

A cross-correlation may be acquired by applying a 2D reception signal of which a size is identical to a size of 1D transmission PLC preamble signal.

In detail, the transmission PLC preamble signal is present as a 2D transmission signal, and the 2D transmission signal may be converted into a 1D signal as illustrated in FIG. 5A or FIG. 5B. A cross-correlation between the transmission PLC preamble signal and the reception signal may be acquired by dividing the reception signal into a real number portion and an imaginary number portion such that each cross-correlation is acquired with respect to a result of converting 2D signals into 1D signals in FIG. 7A or 7B. A sum signal depending on the cross-correlation may be acquired by adding signals at an identical position of a real number cross-correlation result and an imaginary number cross-correlation result with respect to the transmission PLC preamble signal and the reception signal. A maximum value, an OFDM symbol number in which the maximum value is obtained, and a subcarrier position in a frequency axis at which the maximum value is obtained may be detected from a signal obtained by adding the real number cross-correlation and the imaginary number cross-correlation.

Each of the maximum value, the OFDM symbol number in which the maximum value is obtained, and the subcarrier position on the frequency axis at which the maximum value is obtained may be detected and stored by applying the above-described process to all 8×8 reception signals (4K-FFT mode) and 8×16 reception signals (8K-FFT mode) obtained in a process of selecting a 2D reception signal to be applied to a cross-correlation among the reception signals of FIG. 5A or 5B.

Lastly, a PLC preamble and a position of the PLC preamble in a frequency axis are detected as follows.

Referring back to FIG. 7A or 7B, the OFDM symbol number in which a maximum cross-correlation value is obtained and the subcarrier position on the frequency axis may be obtained by searching for the maximum cross-correlation value obtained by applying the above-described process to all 8×8 reception signals (4K-FFT mode) and 8×16 reception signals (8K-FFT mode) in the process of selecting the 2D reception signal. Based on such process, the subcarrier position on the frequency axis at which the PLC preamble is present may be obtained, and the obtained subcarrier position may be determined as the first position information.

Referring back to FIG. 1, second position information on the position of the subcarrier of the PLC preamble defined in a transmission end is detected by restoring the PLC data in operation 130. When a position of the PLC preamble is detected from the reception signal, a position of the PLC data may be found such that a PLC subcarrier position at a transmission end may be found by restoring the PLC data.

To demodulate the reception signal by a reception apparatus of a DOCSIS 3.1 downstream system, a modulation parameter, for example, a time interleaving depth and a QAM modulation order, may be required. The modulation parameter may be obtained by restoring the PLC data. Here, a position of a PLC subcarrier may be also obtained in a process of restoring the PLC data. A PLC may transmit information on an OFDM channel descriptor (OCD) and a downstream profile descriptor (DPD) for transmitting and receiving data of the DOCSIS 3.1 downstream system. The time interleaving depth, the QAM modulation order, and the PLC subcarrier position corresponding to a parameter required for modulating the reception signal may be included in the OCD and the DPD. Through this process, position information on the frequency axis of the PLC subcarrier transmitted from the transmission end may be obtained, and the obtained position information may be determined as the second position information.

The frequency offset may be obtained by comparing the first position information with the second position information in operation 140 of FIG. 1. An integer frequency offset may be estimated by comparing a subcarrier position (first position information) on the frequency axis at which a maximum value obtained through a cross-correlation between the reception signal and the PLC preamble is present to a PLC subcarrier position (second position information) obtained by restoring the PLC data.

In an example, an operation of compensating for a frequency offset by an error using the estimated frequency offset may be further included.

The integer frequency offset may be compensated by calculating a difference between the first position information and the second position information and compensating for a position of a spectrum of the reception signal by the calculated difference.

Figure 8:
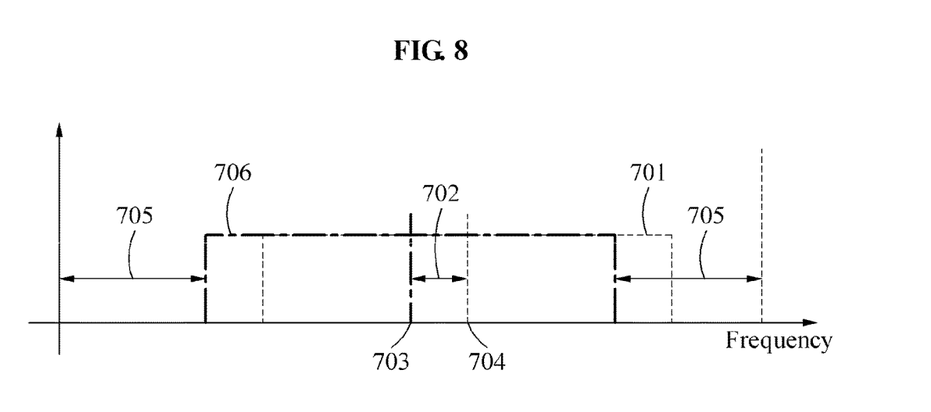
FIG. 8 illustrates a method of compensating for a frequency offset by moving a spectrum by an integer frequency offset according to an example embodiment.
Figure 9:
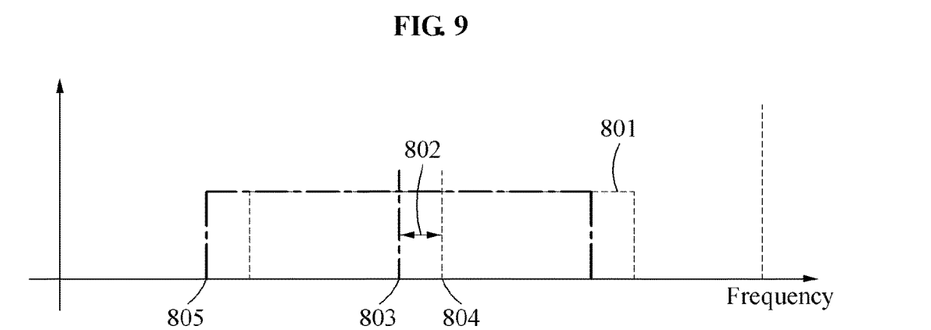
FIG. 9 illustrates a method of compensating for a frequency offset by calculating a start point of a spectrum based on a size of an integer frequency offset according to an example embodiment.

A method of compensating for the frequency offset may vary, and the frequency offset may be compensated by applying examples of FIGS. 8 and 9 according to example embodiments.

FIG. 8 illustrates a method of compensating for a frequency offset by moving (701→706) a spectrum by an integer frequency offset 702 according to an example embodiment. A position of the spectrum is moved by the integer frequency offset 702, such that sizes of guard bands 705 present on both sides of the spectrum are identical in size. In addition, the position of the spectrum may be compensated by reading an active subcarrier 706 only.

FIG. 9 illustrates a method of compensating for a frequency offset by calculating a start point 805 of a spectrum based on a size of an integer frequency offset 802 according to an example embodiment. When a guard band is removed, 3800 subcarriers among 4096 subcarriers are read by calculating a start point of a spectrum based on a size of an integer frequency offset in the 4K-FFT mode. In the 8K-FFT mode, the guard band may be removed and the integer frequency offset may be compensated at the same time through a process of reading 7600 subcarriers among 8192 subcarriers.

Figure 10:
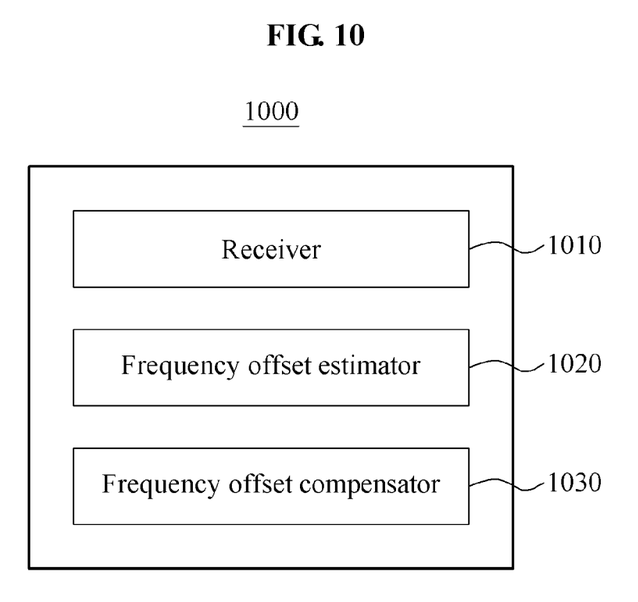
FIG. 10 is a block diagram illustrating a data reception apparatus according to an example embodiment.

FIG. 10 is a block diagram illustrating a data reception apparatus 1000 according to an example embodiment. The data reception apparatus 1000 includes a receiver 1010, a frequency offset estimator 1020, and a frequency offset compensator 1030.

The receiver 1010 receives a reception signal including PLC data and a PLC preamble. The reception signal may be provided in a structure of FIG. 2. Detailed description of FIG. 2 is as described above.

The frequency offset estimator 1020 detects first position information on a position of a subcarrier of the PLC preamble in a frequency axis of the PLC preamble from the reception signal through a cross-correlation between the PLC preamble and the reception signal, and detects second position information on the position of the subcarrier of the PLC preamble defined in a transmission end by restoring the PLC data. The frequency offset may be calculated by comparing the first position information with the second position information. Detailed descriptions provided with reference to FIGS. 3 through 7B are applicable to a process of calculating the frequency offset.

The frequency offset compensator 1030 compensates for an integer frequency offset by calculating a difference between the first position information and the second position information, and compensating for a position of a spectrum of the reception signal by the calculated difference. A process of compensating for the estimated integer frequency offset may be performed by applying features of FIG. 8 or FIG. 9.

According to an example embodiment, it is possible to minimize interference between subcarriers by accurately estimating and compensating for an integer frequency offset in a system based on an OFDM transmission technology.

According to another example embodiment, it is possible to detect a position of a PLC subcarrier in a PLC synchronization obtaining process when a PLC synchronization is obtained through a PLC cross-correlation and to obtain position information of a PLC subcarrier positioned on a transmission end in a process of restoring PLC data in order to extract a parameter required for modulating a received DOCSIS 3.1 downstream signal and thus, it is economical in terms of cost and time because additional calculation for estimating an integer frequency offset in each operation is unnecessary. Further, it is possible to apply such method to a low signal-to-noise ratio (SNR) less than or equal to 10 dB such that an application range is relatively wide.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The units and/or modules described herein may be implemented using hardware components and software components. For example, the hardware components may include microphones, amplifiers, band pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claim.

What is claimed is:

1. A frequency offset estimation method temporarily performed by a computer, the method comprising:
   receiving a reception signal including PLC data and a physical layer link channel (PLC) preamble;
   detecting first position information on a position of a subcarrier of the PLC preamble in a frequency axis from the reception signal through a cross-correlation between the PLC preamble and the reception signal;
   detecting second position information on the position of the subcarrier of the PLC preamble defined in a transmission end by restoring the PLC data; and
   calculating a frequency offset by comparing the first position information with the second position information.

2. The method of claim 1, wherein the detecting of the first position information comprises detecting a position of a subcarrier on the frequency axis at which the cross-correlation between the PLC preamble and the reception signal corresponds to a maximum value and determining the position of the subcarrier as the first position information.

3. The method of claim 2, further comprising:
   converting the PLC preamble corresponding to two-dimensional (2D) data into one-dimensional (1D) data, and acquiring the cross-correlation by selecting a signal of which a size is identical to a size of the PLC preamble from the reception signal.

4. The method of claim 1, wherein the detecting of the second position information comprises detecting the PLC data based on a position of the PLC preamble detected from the reception signal, and detecting a position of a PLC subcarrier positioned in a transmission device by restoring the detected PLC data and determining the position of the PLC subcarrier as the second position information.

5. The method of claim 1, further comprising:
   compensating for an integer frequency offset by calculating a difference between the first position information and the second position information and compensating for a position of a spectrum of the reception signal by the calculated difference.

6. The method of claim 5, wherein the compensating for the integer frequency offset comprises compensating for the frequency offset by moving the spectrum of the reception signal by the calculated difference.

7. The method of claim 5, wherein the compensating for the integer frequency offset comprises compensating for the frequency offset by correcting a start point of the spectrum of the reception signal based on a size of the calculated difference.

8. The method of claim 1, wherein the calculating of the frequency offset comprises calculating an integer frequency offset based on the frequency offset.

9. The method of claim 1, wherein the reception signal is transmitted based on a data over cable service specification (DOCSIS) 3.1 downstream system.

10. A data reception apparatus comprising:
    a receiver configured to receive a reception signal including PLC data and a physical layer link channel (PLC) preamble;
    a frequency offset estimator configured to detect first position information on a position of a subcarrier of the PLC preamble in a frequency axis from the reception signal through a cross-correlation between the PLC preamble and the reception signal, detect second position information on the position of the subcarrier of the PLC preamble defined in a transmission end by restoring the PLC data, and calculate a frequency offset by comparing the first position information with the second position information; and
    a frequency offset compensator configured to compensate for an integer frequency offset by calculating a difference between the first position information and the second position information, and compensating for a position of a spectrum of the reception signal by the calculated difference.

* * * * *